United States Patent
Lee et al.

(10) Patent No.: US 7,600,312 B2
(45) Date of Patent: Oct. 13, 2009

(54) DIE ASSEMBLY FOR MANUFACTURING LAMINA STACKS THAT INCLUDE FORMED FEATURES

(75) Inventors: Barry A. Lee, Fort Wayne, IN (US); Thomas R. Neuenschwander, Fort Wayne, IN (US)

(73) Assignee: L.H. Carbide Corporation, Fort Wayne, IN (US)

(*) Notice: Subject to any disclaimer, the term of this patent is extended or adjusted under 35 U.S.C. 154(b) by 369 days.

(21) Appl. No.: 11/179,420

(22) Filed: Jul. 12, 2005

(65) Prior Publication Data

US 2007/0011866 A1    Jan. 18, 2007

(51) Int. Cl.
B23P 19/00 (2006.01)
B26D 3/00 (2006.01)
H02K 1/00 (2006.01)

(52) U.S. Cl. ............... 29/738; 29/609; 29/715; 29/732; 29/733; 29/736; 83/55; 83/255; 83/405; 310/216

(58) Field of Classification Search ............ 29/609, 29/731, 596, 598, 732, 738, 715, 733, 734, 29/736, 838; 310/216, 259, 217, 218; 83/682, 83/687, 684, 678, 685, 686, 255, 405, 55, 83/549, 733; 76/107.1, 73, 30, 29; 72/388, 72/313, 382, 383; 73/388, 313, 382, 383
See application file for complete search history.

(56) References Cited

U.S. PATENT DOCUMENTS

| | | | |
|---|---|---|---|
| 1,992,962 A | 3/1935 | Murch | 164/17 |
| 3,107,566 A | 10/1963 | Archer | 83/33 |
| 3,388,582 A | 6/1968 | Wesstrom et al. | 72/335 |
| 4,002,049 A * | 1/1977 | Randolph, Sr. | 72/388 |
| 4,597,168 A | 7/1986 | Oboshi et al. | 29/596 |
| 4,619,028 A | 10/1986 | Neuenschwander | 29/33 L |
| 4,738,020 A | 4/1988 | Neuenschwander | 29/598 |
| 5,048,385 A * | 9/1991 | Eckert et al. | 83/34 |
| 5,087,849 A | 2/1992 | Neuenschwander | 310/216 |
| 5,123,155 A | 6/1992 | Neuenschwander | 29/596 |

(Continued)

OTHER PUBLICATIONS

U.S. Appl. No. 10/959,292, filed Oct. 6, 2004 entitled Die Assembly and Method for Manufacutring Lamina Stacks From a Plurality of Separate Stropes of Stock Material.

*Primary Examiner*—Minh Trinh
*Assistant Examiner*—Tai Nguyen
(74) *Attorney, Agent, or Firm*—Baker & Daniels LLP (57) ABSTRACT

A progressive die assembly and method for manufacturing lamina stacks from a strip of substantially planar material, in which at least some of the individual laminas are formed with portions which extend from, or are otherwise not within, the plane of the material strip. The die assembly includes die stations having punches for punching features substantially within the plane of the strip corresponding to individual laminas, such as lamina profiles and lamina interlock features. Additionally, the die assembly also includes at least one forming station which includes a selectively actuable forming tool which is configured to form a lamina portion in the strip which is disposed outwardly of the strip plane, such as by bending a portion of the strip. The die further includes a blanking station including a blanking punch for blanking individual laminas from the strip, and at least one staking punch for engaging lamina interlock features to interlock a blanked lamina with previously blanked laminas in a choke cavity to form an interlocked lamina stack.

14 Claims, 8 Drawing Sheets

U.S. PATENT DOCUMENTS

| | | | |
|---|---|---|---|
| 5,241,138 A | 8/1993 | Neuenschwander | 177/50 |
| 5,349,740 A * | 9/1994 | Neuenschwander | 29/596 |
| 5,349,741 A * | 9/1994 | Neuenschwander | 29/598 |
| 5,406,243 A | 4/1995 | Jenkins et al. | 336/217 |
| 5,755,023 A | 5/1998 | Neuenschwander | 29/596 |
| 5,771,565 A * | 6/1998 | Walters | 29/596 |
| 5,799,387 A * | 9/1998 | Neuenschwander et al. | 29/598 |
| 5,881,450 A | 3/1999 | Neuenschwander | 29/609 |
| 6,000,119 A * | 12/1999 | Neuenschwander et al. | 29/598 |
| 6,163,949 A * | 12/2000 | Neuenschwander | 29/521 |
| 6,192,575 B1 | 2/2001 | Neuenschwander | 29/609 |
| 6,195,875 B1 * | 3/2001 | Neuenschwander | 29/732 |
| 6,237,214 B1 * | 5/2001 | Neuenschwander | 29/598 |
| 6,484,387 B1 * | 11/2002 | Lee et al. | 29/596 |
| 6,745,458 B2 * | 6/2004 | Neuenschwander | 29/609 |

* cited by examiner

FIG_1

FIG_2

FIG_4

FIG_3

FIG_5

DIE ASSEMBLY FOR MANUFACTURING LAMINA STACKS THAT INCLUDE FORMED FEATURES

BACKGROUND OF THE INVENTION

1. Field of the Invention

The present invention relates to a progressive die assembly and a method for manufacturing lamina stacks which include formed features.

2. Description of the Related Art

The manufacture of parts, e.g., stators and rotors for electric motors, ignition assembly cores, or other parts which employ stacked laminas is well known in the art. Typically, the laminas are blanked from a continuous strip of stock material and are then stacked and bound together to form the completed part. Progressive die assemblies for producing lamina stacks, wherein a strip of lamina material is fed through a sequence of punching steps to progressively form the laminas to the desired end configurations, are also well known.

The strips of stock material from which the individual laminas are formed, blanked, and stacked are substantially planar, such that each of the individual laminas formed and blanked from the strip to form the stack is also planar. In this manner, known lamina stacks are limited to a stack of planar laminas in which each individual lamina is disposed entirely within a single plane. In some applications, however, it is envisioned that it will be useful to form lamina stacks including a plurality of stacked, planar laminas with at least one lamina having a portion thereof which is disposed outside of the plane of the remainder of the lamina.

What is needed is a die assembly and method which is an improvement over the foregoing.

SUMMARY OF THE INVENTION

The present invention provides a progressive die assembly and method for manufacturing lamina stacks from a strip of substantially planar material, in which at least one of the individual laminas is formed with portions which extend from, or are otherwise not within, the plane of the material strip. The die assembly includes die stations having punches for punching features substantially within the plane of the strip corresponding to individual laminas, such as lamina profiles and lamina interlock features. Additionally, the die assembly also includes at least one forming station which includes a selectively actuable forming tool which is configured to form a lamina portion in the strip which is disposed outwardly of the strip plane, such as by bending a portion of the strip. The die further includes a blanking station including a blanking punch for blanking individual laminas from the strip, and at least one staking punch for engaging lamina interlock features to interlock a blanked lamina with previously blanked laminas in a choke cavity to form an interlocked lamina stack.

In one embodiment, the die assembly includes a plurality of selectively actuable forming stations, the forming stations operable to form bends in the strip along bend lines which are non-colinear. In this manner, a plurality of laminas, each having portions which are formed by bending, may be stacked upon one another with their bent portions overlapping one another such that a line connecting the bend lines of the formed lamina portions is disposed at an angle with respect to a line disposed parallel to the side of the lamina stack from which the bent portions project. In another embodiment, the forming station or stations may be selectively indexable, such as by being movable laterally with respect to the progression direction of the strip, whereby the forming tool and insert set associated with the station or stations is actuable to form bends in successive portions of the material strip along non-colinear bend lines.

Advantageously, the die assemblies of the present invention are capable of forming lamina stacks from a planar strip of material, with at least some of the laminas including lamina features which are punched substantially within the plane of the strip, and with at least some of the laminas additionally including formed features which project outwardly from the strip plane, in order to provide greater design freedom with respect to the overall profile or shape of the lamina stack.

In one form thereof, the present invention provides a die assembly for manufacturing lamina stacks from a strip of substantially planar material, including at least one die station including a punch configured to punch a lamina feature substantially within the plane of the strip; at least one forming station including at least one forming tool configured to form a non-interlocking lamina portion in the strip which is disposed outwardly of the plane of the strip; a blanking station including a blanking punch configured to blank individual laminas from the strip; and a choke assembly including a choke cavity configured to receive individual laminas blanked from the strip.

In another form thereof, the present invention provides a die assembly for manufacturing lamina stacks from a strip of substantially planar material, including at least one die station including a lamina interlock feature punch configured to punch a lamina interlock feature in the strip; at least one forming station including at least one selectively actuable forming tool configured to form a lamina portion in the strip which is disposed substantially outwardly of the plane of the strip; a choke assembly including a choke cavity configured to receive individual blanked laminas from the strip; and a blanking station including at least one blanking punch configured to blank individual laminas from the strip, the blanking station further including at least one staking punch engageable with a respective lamina interlock feature in the strip to interlock blanked laminas with previously blanked laminas within the choke assembly.

In a further form thereof, the present invention provides a method of manufacturing lamina stacks in a die assembly, including the steps of guiding a strip of substantially planar material through the die; punching lamina features substantially within the plane of the strip, at least some of the features including lamina interlock features; forming a portion in at least some of the individual laminas which is disposed outwardly of the plane of the strip; blanking individual laminas from the strip; and interlocking the blanked laminas with respect to one another to form a stack.

In a still further form thereof, the present invention provides a lamina stack, including a plurality of individual stacked laminas interlocked with respect to one another, at least one of the laminas having a first portion disposed within a first plane and a second, non-interlocking portion disposed within a second plane different from the first plane.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention any manner.

DETAILED DESCRIPTION

Referring to FIGS. 1-4, an exemplary lamina stack 20 is shown, which may be manufactured using the die assemblies and methods of the present invention. Lamina stack 20 includes a plurality of stacked, generally rectangularly-profiled individual laminas 22, which are interlocked with respect to one another in the manner described below. The laminas 22 of stack 20 include punched features and additionally, some of laminas 22 include projections which are formed by the die assemblies of the present invention in the manner described below. Although shown as rectangular, the overall shape or profile of laminas 22 may vary, and the overall shape or profile of lamina stack 20 may also vary. Lamina stacks 20, or lamina stacks similar thereto, may be used as electric motor rotors or stators, or in other applications.

Lamina stack 20 includes a top side 24 defined by the uppermost lamina 22 in stack 20, a bottom side 26 defined by the lowermost lamina 22 in stack 20, and also includes front side 28, rear side 30, left side 32, and right side 34 each defined collectively by the peripheral edges of the individual laminas 22. Front side 28 includes a pair of recesses or indentations 36 formed in each of the laminas 22, thereby giving each lamina 22, and in turn lamina stack 20, an overall E-shaped profile. Lamina stack 20 is made from two types of laminas 22, including first laminas 22a, each of which includes only punched features and is disposed in its entirety within a single plane, and second laminas 22b, which are shaped similarly to first laminas 22a but, in addition to punched features, also include projections 40 which project from, or are disposed outwardly from, the plane in which the remainder of the lamina is disposed. Projections 40 are formed within the die assemblies of the present invention in the manner described below, and may be used to mount lamina stack 20 in an electric motor or other application, for example.

Figure 1:
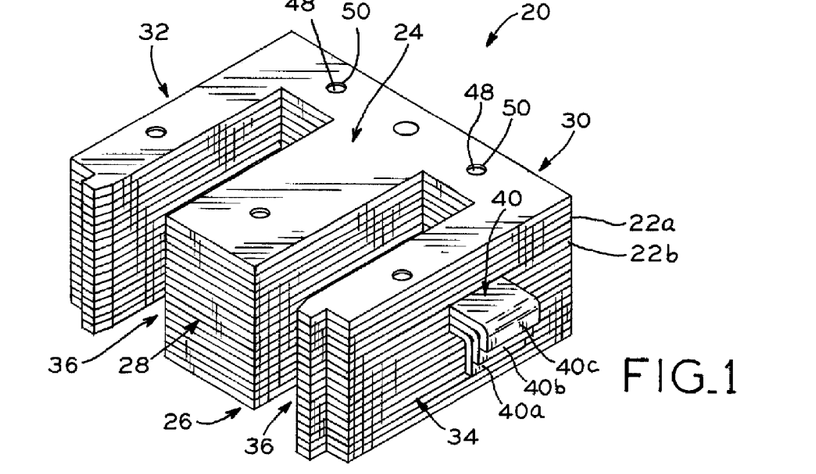
FIG. 1 is a perspective view of an exemplary lamina stack including formed features which may be manufactured with the die assemblies and methods of the present invention.
Figures 2, 3, 4:
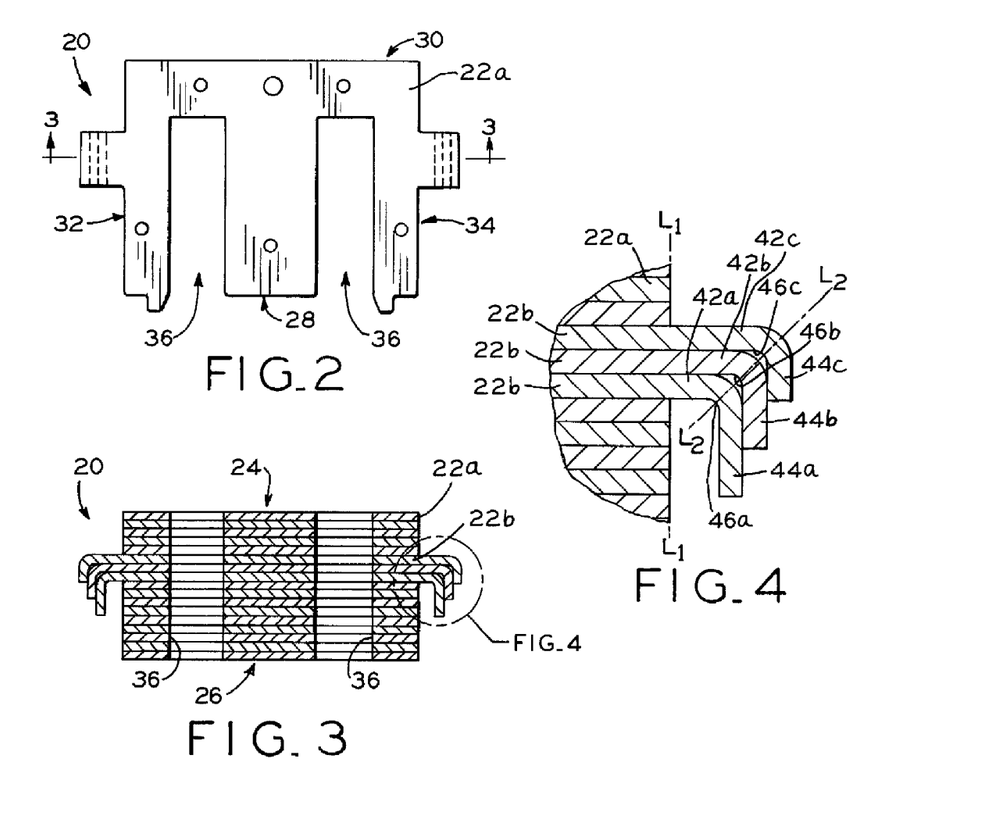
FIG. 2 is a top view of the lamina stack of FIG. 1.
FIG. 3 is a sectional view through the lamina stack along line 3-3 of FIG. 2.
FIG. 4 is a fragmentary view of a portion of the lamina stack of FIG. 3.

Referring additionally to FIG. 4, projections 40a, 40b, and 40c of three adjacent second laminas 22b are shown, which include first portions 42a, 42b, and 42c extending therefrom in respective planes which are parallel and co-planar with the remainder of second laminas 22b, and second portions 44a, 44b, and 44c which are bent with respect to first portions 42a, 42b, and 42c at respective bends or bend lines 46a, 46b, and 46c. In this manner, laminas 22b include formed features which are disposed in a third dimension outside the plane of the remainder of the laminas 22b, which is in addition to the two dimensions in which the conventional stamped or punched features of laminas 22a are disposed. Also, as may be seen from FIG. 4, projections 40a, 40b, and 40c extend outwardly from the planes of their respective laminas by a distance which is greater than the thickness of the stock material from which the laminas are formed. As may be seen from FIG. 4, due to the overlap of projections 40a, 40b, and 40c bends 46a, 46b, and 46c are not colinear, but are rather spaced progressively further away from a line $L_1$-$L_1$ which is associated with, and parallel to, the right side 34 of lamina stack 20. Thus, when second laminas 22b are stacked with respect to one another, second portions 44a, 44b, and 44c of projections 40a, 40b, and 40c, respectively, overlap with one another in the manner shown in FIG. 4, in which bends 46a, 46b, and 46c are disposed or aligned along a mutual bend line $L_2$-$L_2$ oriented at an angle with respect to line $L_1$-$L_1$. As shown in FIGS. 2 and 3, left side 32 of stack 20 includes identical projections 40a, 40b, and 40c.

Additionally, as shown in FIGS. 1, 2 and 8-11 and described further below, each of the laminas 22, except for the bottom lamina 22 in stack 20, includes a plurality of interlock tabs 48 staked therein, each of which extends slightly outwardly from one side of a lamina to thereby define a corresponding interlock recess 50 in the opposite side of the lamina. Typically, interlock tabs 48 extend from respective sides of their laminas by a distance which is less than the thickness of the stock material from which the laminas are formed. The bottom lamina 22 in lamina stack 20 includes a set of apertures 52 (FIGS. 8-11) punched therein which are adapted to receive the interlock tabs 48 of the next, upper adjacent lamina 22 in lamina stack 20. Other than the bottom lamina 22, the interlock tabs 48 of each lamina 22 in lamina stack 20 interlock into the interlock recesses 50 of an adjacent lower lamina to thereby interlock all of the laminas 22 in lamina stack 20 with one another.

The foregoing interlock arrangement for interlocking laminas in a stack is described in further detail below, and is also described in detail in U.S. Pat. Nos. 4,619,028, 5,241,138, 5,349,741 and 6,163,949 to Neuenschwander, each assigned to the assignee of the present invention, the disclosures of which are expressly incorporated herein by reference. Although interlock tabs 48, recesses 50, and apertures 52 are shown herein as circular in shape, the shape of same may vary, as discussed in the foregoing patents. Further details regarding lamina stacks which include individual lamina layers which may have various outside perimeter shapes and which may have two or more discrete lamina portions, and the manner of manufacturing same, are described in the above-incorporated U.S. Pat. No. 6,163,949 to Neuenschwander. Additionally, lamina stacks 20 may also include different types of laminas, made from different materials, which are formed from two different strips of stock material in the manner described in U.S. patent application Ser. No. 10/959, 292, entitled DIE ASSEMBLY AND METHOD FOR MANUFACTURING LAMINA STACKS FROM A PLURALITY OF SEPARATE STRIPS OF MATERIAL, filed on Oct. 6, 2004, assigned to the assignee of the present invention, the disclosure of which is expressly incorporated herein by reference.

Figure 5:
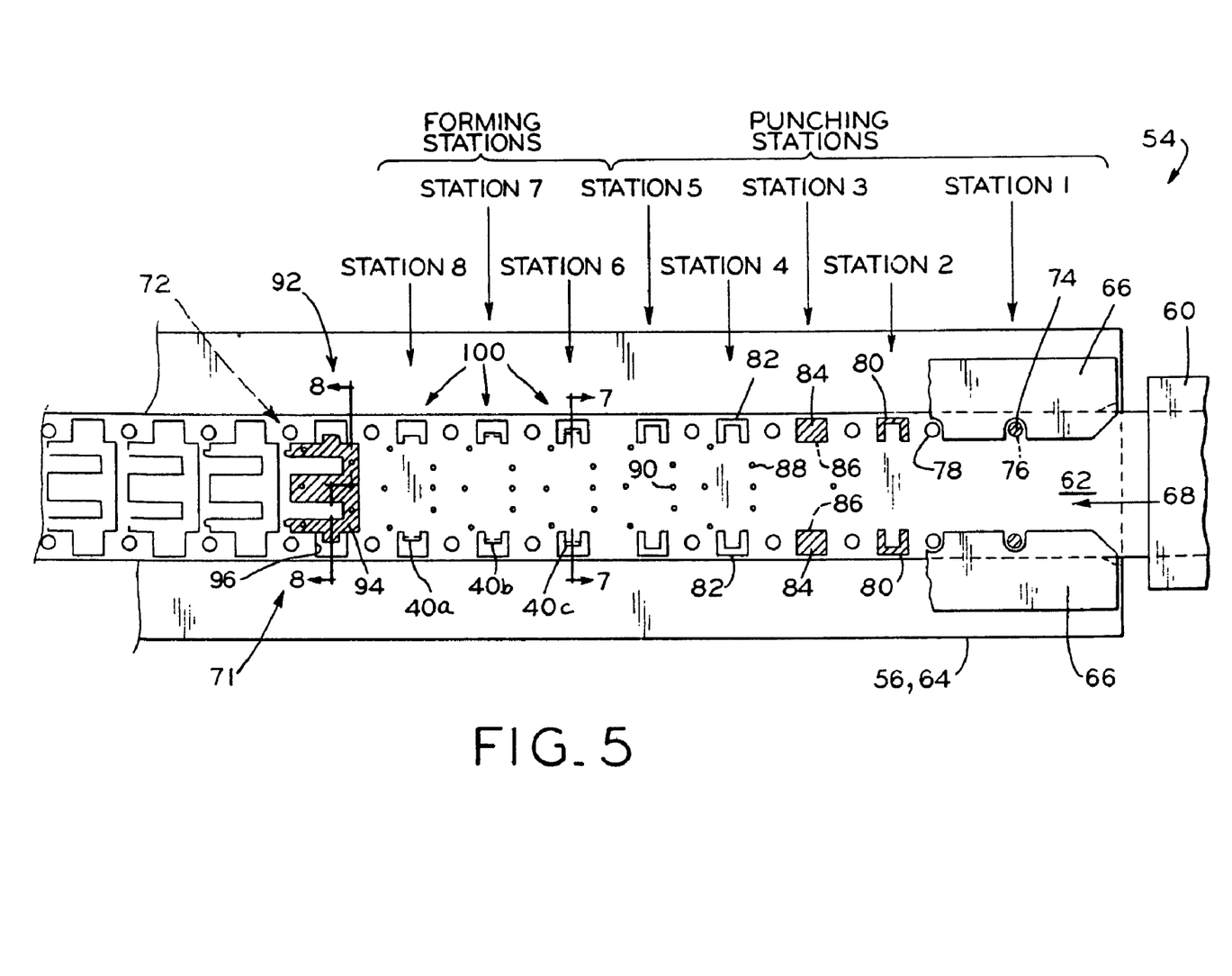
FIG. 5 is a top view of the lower die assembly of a die assembly according to the present invention, showing the strip layout of a strip of stock material which may be fed into the die assembly.
Figure 6:
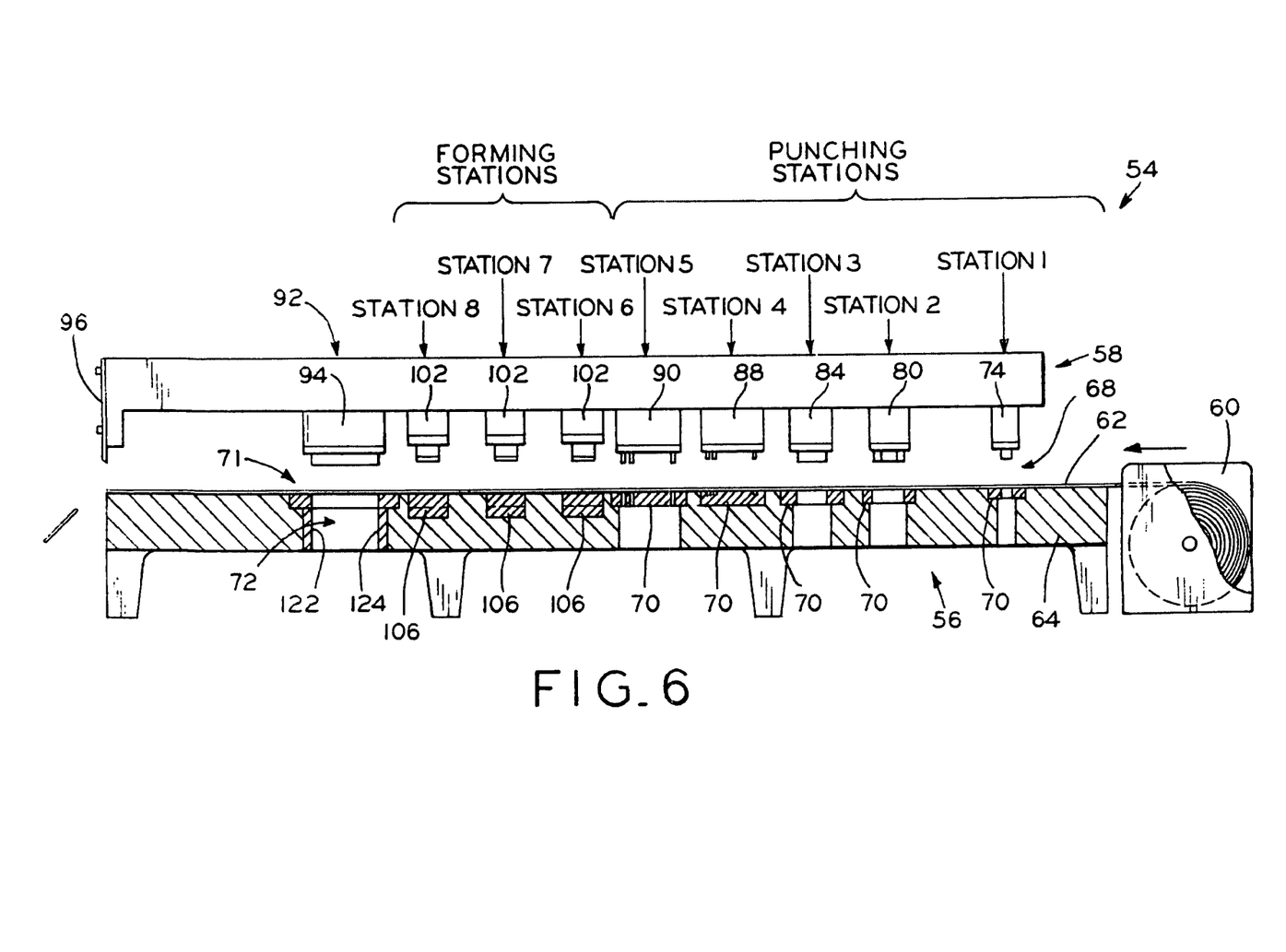
FIG. 6 is an elevational, partially sectioned view of the die assembly, showing the lower die assembly, the upper die assembly, punch sets, choke cavity, and a stock material feeder for feeding a strip of stock material into the die assembly.

Referring to FIGS. 5 and 6, a die assembly 54 according to a first embodiment of the present invention is shown, which may be used to manufacture lamina stacks from a strip of stock material, such as the exemplary lamina stack 20 shown in FIGS. 1-4 and described above, or other lamina stacks which include formed features, as opposed to only including punched features. Referring to FIG. 6, die assembly 54 generally includes a lower die assembly 56 and an upper die assembly 58. Die assembly 54 is installed within a press (not shown) and, in operation, the press reciprocates upper die assembly 58 upwardly and downwardly with respect to the fixed lower die assembly 56 in a known manner.

Referring to FIGS. 5 and 6, a stock material feeder 60 is used with die assembly 54 to feed a strip of stock material 62 between lower die assembly 56 and upper die assembly 58. As described below, individual laminas 22 are shaped, formed, and blanked from strip 62, and are also stacked and interlocked within die assembly 54 to form lamina stacks 20. Strip 62 of stock material is typically mounted within feeder 60 in the form of a coil, and feeder 60 is operable to feed strip 62 of stock material from the coil into die assembly 54 along the direction the arrow shown in FIG. 6. Referring to FIGS. 5 and 6, lower die assembly 56 includes a lower die bed 64 and a set of guide rails 66 for guiding strip 62 of stock material through die assembly 54. Only portions of guide rails 66 are shown in FIG. 5 for clarity, and a portion of each guide rail may optionally overlap a portion of strip 62, as shown. Guide rails 66 together define a feed pathway 68 extending through die assembly 54 through which strip 62 of stock material is fed.

As shown in FIG. 6, lower die bed 64 of lower die assembly 56 includes a plurality of carbide die inserts 70 in operative alignment with the various punches of upper die assembly 58 for punching pilot holes and lamina features in strip 62 in the manner described below. Lower die assembly 56 additionally includes a choke assembly 71 that includes a choke cavity 72 at blanking station 92 of die assembly 54, which is adapted to receive laminas blanked from strip 62, as described below. Upper die assembly 58 includes a punch set corresponding to, and aligned along, feed pathway 68, which includes individual punches which cooperate with the die inserts 70 of lower die assembly 56 to punch lamina features in strip 62, including a blanking punch 94 at blanking station 92 of die assembly 54 for blanking, or separating, individual laminas from strip 62.

Referring to FIGS. 5 and 6, lower and upper die assemblies 56 and 58 include a plurality of die stations along feed pathway 68 at which pilot holes and lamina features are punched in strip 62 of stock material, and in which features are formed in strip 62. A pair of pilot hole punches 74 of upper die assembly 54 initially punch pilot holes 76 on opposite sides of strip 62 at Station 1, which pilot holes 76 are engaged by pilot pins 78 of upper die assembly 54 at various locations throughout die assembly 54 to align and locate strip 62 at each station while other punches of the punch sets and forming tools of the forming stations are performing stamping, forming, and/or blanking operations on strip 62. At Station 2, a pair of selectively actuable punches 80 of upper die assembly 58 punch a pair of opposing U-shaped openings 82 in strip 62 which correspond to, and form the outlines of, projections 40 of second laminas 22b, shown in FIG. 3. At Station 3, a pair of selectively actuable punches 84 of upper die assembly 58 punch a pair of opposing rectangular openings 86 in strip 62 which define portions of left and right edges of first laminas 22a.

At Station 4, a plurality of selectively actuable staking punches 88 punch interlock tabs 48 in strip 62 corresponding to each lamina 22 except the bottom lamina 22 in stack 20. At Station 5, a plurality of selectively actuable punches 90 punch apertures 52 in strip 62 which correspond to the bottom lamina 22 in stack 20. Stations 6, 7 and 8 are selectively actuable forming stations at which projections 40 in second laminas 22b are formed in the manner described below. At blanking station 92, a blanking punch 94 separates an individual lamina from strip 62 while concurrently transferring same into choke cavity 72 and interlocking the blanked lamina with a next, adjacent lower lamina in choke cavity 72, as described below. After a lamina 22 is separated from strip 62 at blanking station 92, strip 62 is advanced some distance before a cutting punch 96 separates individual waste portions from the remainder of strip 62, which are discarded.

Each of punches 80, 84, 88 and 90, as well as the forming tools of forming Stations 6-8, described below, may be selectively actuated to selectively punch or form features in strip 62 for selectively shaping first and second laminas 22a and 22b in strip 62. Further details regarding the manner in which the punches and forming tools of die assembly 54 may be selectively actuated, such as via hydraulic camming arrangements, are disclosed in the above-incorporated U.S. Pat. Nos. 4,619,028 and 6,163,949 to Neuenschwander.

Figure 7:
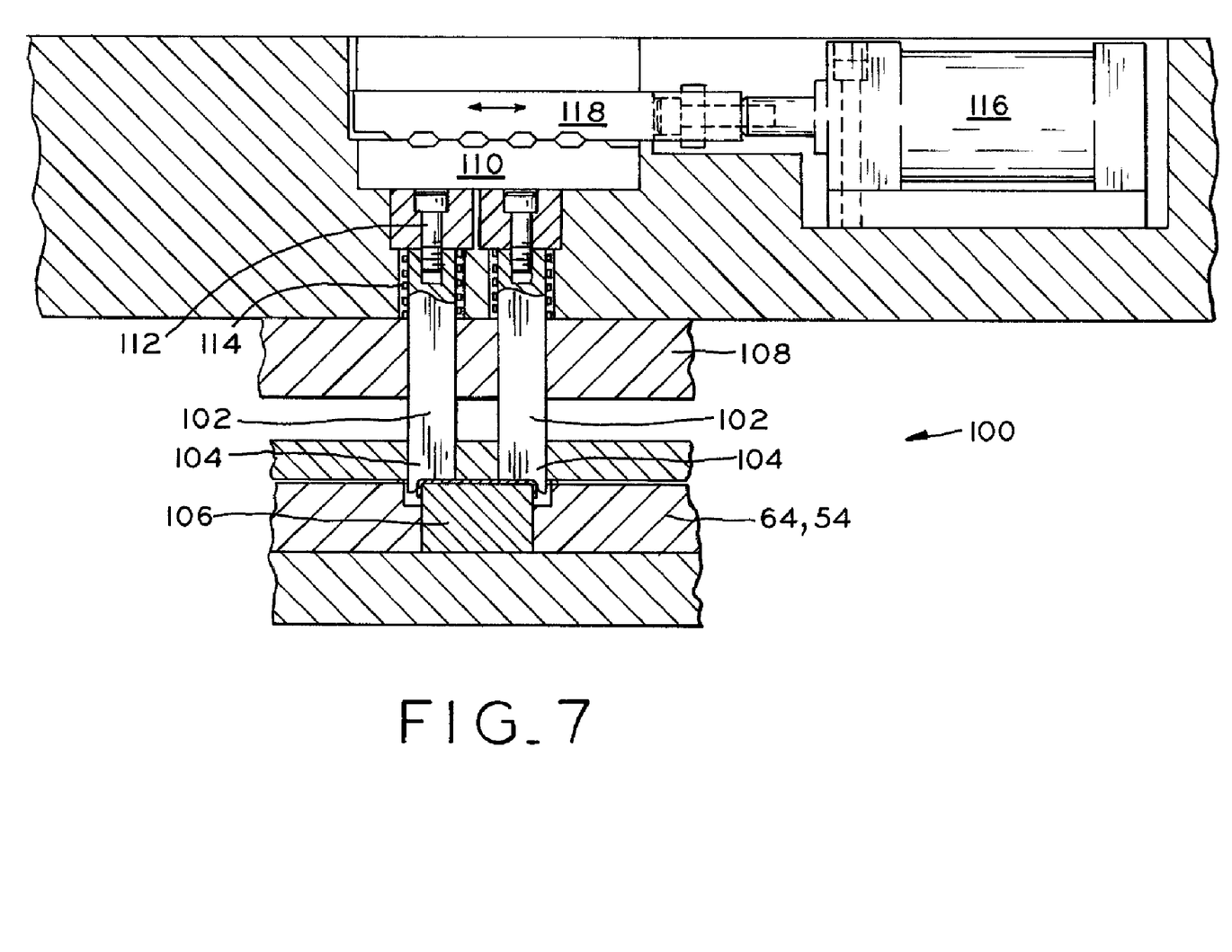
FIG. 7 is a sectional view taken along line 7-7 of FIG. 5, showing the components of one of the selectively actuable forming stations of the die assembly.

Referring additionally to FIG. 7, details of an exemplary selectively actuable forming station 100 are shown, corresponding to Stations 6-8 of die assembly 54. Forming station 100 includes a pair of forming tools 102 which are laterally opposed with respect to the progression direction of strip 62. Forming tools 102 have forming ends 104 which are shaped to cooperate with opposite sides of a carbide forming insert 106 to bend projections 40 in strip 62 in the manner described below. Forming tools 102 are positioned within tool holder 108 of upper die assembly 58, are attached to lower camming bar 110 via fasteners 112, and springs 114 are disposed about forming tools 102 between lower camming bar 110 and tool holder 108. A linear actuator 116, such as a servomotor or stepper motor, is coupled to upper camming bar 118, such as via a screw drive or other drive, and is operable to move upper camming bar 118 laterally with respect to lower camming bar 110 to align or misalign the teeth of upper camming bar 118 with those of lower cam camming bar 118.

When forming station 100 is actuated, upper camming bar 118 is disposed in the position shown in FIG. 7, with the teeth thereof aligned with those of lower camming bar 110 such that, upon the down stroke of upper die assembly 58 shown in FIG. 7, upper die assembly 58, upper camming bar 118, lower camming bar 110, and forming tools 102 move downwardly as a unit, with forming ends 104 of forming tools 102 engaging projections 40 in strip 62 to bend projections 40 downwardly about the edges of carbide forming insert 106 as shown. In this manner, with reference to FIGS. 3 and 4, a pair of second portions 44a of projections 40a are bent along bend lines 46a from first portions 42a of projections 40a on opposite sides of each lamina 22b. When forming station 100 is not actuated, upper camming bar 118 is moved by linear actuator 116 to a position in which the teeth thereof are misaligned with those of lower camming bar 110. In this position, upon downward movement of upper die assembly 58, a small clearance space is provided between lower and upper camming bars 110 and 118 such that, upon downward movement of upper die assembly 58, forming ends 104 of forming tools 102 may initially engage strip 62, but due to the fact that lower and upper camming bars 110 and 118 are effectively decoupled, forming tools 102 and lower camming bar 110 remain stationary while the remainder of upper die assembly 58 moves slightly downwardly in its down stroke, such that forming tools do not bend projections 40 of strip 62. In this manner, forming station 100 is selectively actuable to bend projections 40 only in selected laminas 22b. The forming stations 100 of die assembly Stations 7 and 8 operate in an identical manner, with forming tools 102 and carbide forming inserts 106 thereof configured to form bend lines 46b and 46c to thereby form projections 40b and 40c in second laminas 22b, respectively.

Figure 8:
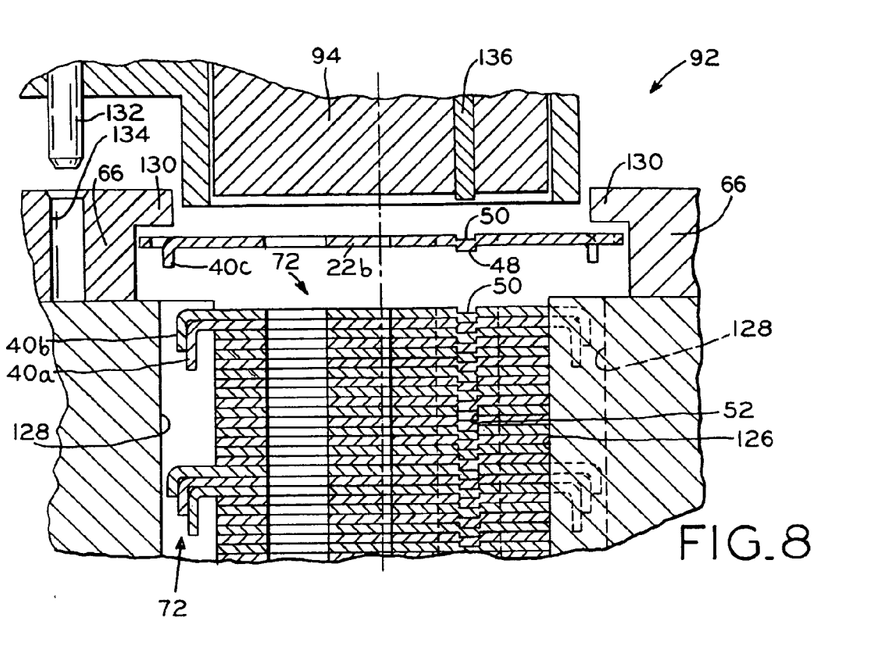
FIG. 8 is a sectional view taken along the bent line 8-8 of FIG. 5, showing concurrently two different sections through the blanking station and choke cavity of the die assembly at the beginning of a blanking stroke.

Referring to FIG. 8, further details of choke cavity 72 are shown wherein, in FIGS. 8-11, choke cavity 72 is shown in a two-part sectional view taken along line 8-8 of FIG. 5. Choke cavity 72 is disposed within lower die bed 64 of lower die assembly 52, and includes front wall 122 and rear wall 124 (FIG. 6), as well as a pair of side walls 126 (FIG. 8) for closely receiving the edges of laminas 22 which correspond to the front, rear, left, and right sides 28, 30, 32, and 34 of lamina stack 20. Choke cavity 72 also includes a pair of vertical slots 128 (FIG. 8) therein which receive projections 40a, 40b, and 40c of second laminas 22b. As shown in FIG. 8, guide rails 66 of lower die assembly 54 also include strip overlap portions 130 which are spaced upwardly from lower die bed 64 a sufficient distance to provide clearance for projections 40a, 40b, and 40c which are formed in strip 62 at forming Stations 6-8. In one embodiment, overlap portions 130 of guide rails 66 may be disposed relatively closely adjacent die bed 64 prior to Station 6, where strip 62 is substantially planar, with overlap portions 130 then ramping upwardly at Station 6 to provide additional clearance thereafter for accommodating includes projections 40a, 40b, and 40c in strip 62. Alternatively, die bed 62 may include a pair of channels (not shown) therein for accommodating projections 40a, 40b, and 40c after same are formed in strip 62.

As shown in FIG. 8, upper die assembly 58 may also include guide pins 132 which are received within corresponding guide pin bores 134 in lower die bed 64 during each downward die stroke of upper die assembly 58 to ensure proper alignment of upper die assembly 58 with respect to lower die assembly 56 and choke cavity 72 in a blanking operation. If the guide pins 132 do not properly locate within the guide pin bores 134 in a given die stroke, blanking punch 94 is disabled by a camming arrangement within upper die assembly 58, such as that described above, to prevent damage to blanking punch 94, choke cavity 74, or other components of die assembly 54. Upper die assembly 58 additionally includes a blanking punch 94 which is aligned with choke cavity 72. Blanking punch 94 additionally includes a plurality of staking punch inserts 136, only one of which is shown in FIGS. 8-11 for clarity, which extend a small distance beneath blanking punch 94 for engaging interlock recesses 48 in the laminas of strip 62 to interlocking a blanked lamina 22 with a lower adjacent lamina 22 which has already been separated from strip 62.

With reference to FIGS. 8-11, a blanking operation is shown at blanking station 92 of die assembly 54, wherein a lamina 22, shown herein as a second lamina 22b, is concurrently blanked from strip 62 and interlocked with an adjacent lower lamina 22b within choke cavity 72. In FIG. 8, the die stroke corresponding to the blanking operation has not yet begun, and upper die assembly 58 is disposed upwardly of lower die assembly 56. A stock lifter (not shown) lifts strip 62 of stock material upwardly a small distance from choke cavity 72 and the remainder of lower die bed 64 of lower die assembly 56 to allow projections 40a, 40b, and 40c to clear lower die bed 64 and to prevent interlock tabs 48, which have earlier been formed in strip 62 at previous die stations in the manner described above, from being snagged on choke cavity 72 or lower die bed 64 during progressive movement of strip 62.

Figure 9:
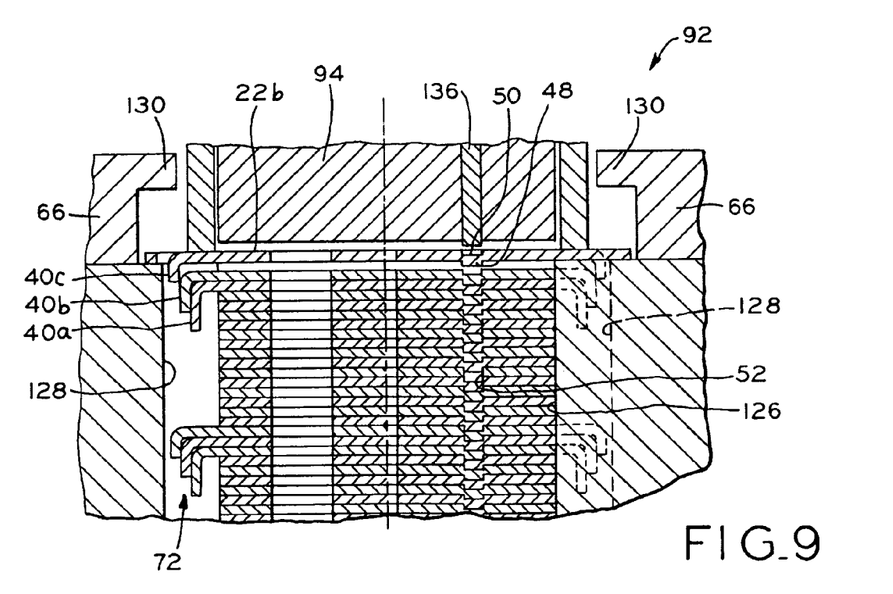
FIG. 9 is a continuation of FIG. 8, showing the initial engagement of the blanking punch with the material strip.

In FIG. 9, the die stroke has begun, and upper die assembly 58 has moved downwardly to engage and locate the guide pins 132 thereof within guide pin bores 134 of lower die assembly 58. Staking punch inserts 136 of blanking punch 94 are engaged within corresponding interlock recesses 48 of strip 62 with respect to a lamina 22b which will be blanked from strip 62. Concurrently, the remainder of blanking punch 94 is also brought into abutment with strip 62, and strip 62 is pressed downwardly against the spring bias of the stock lifter and into abutment with the upper edge of choke cavity 72.

Figure 10:
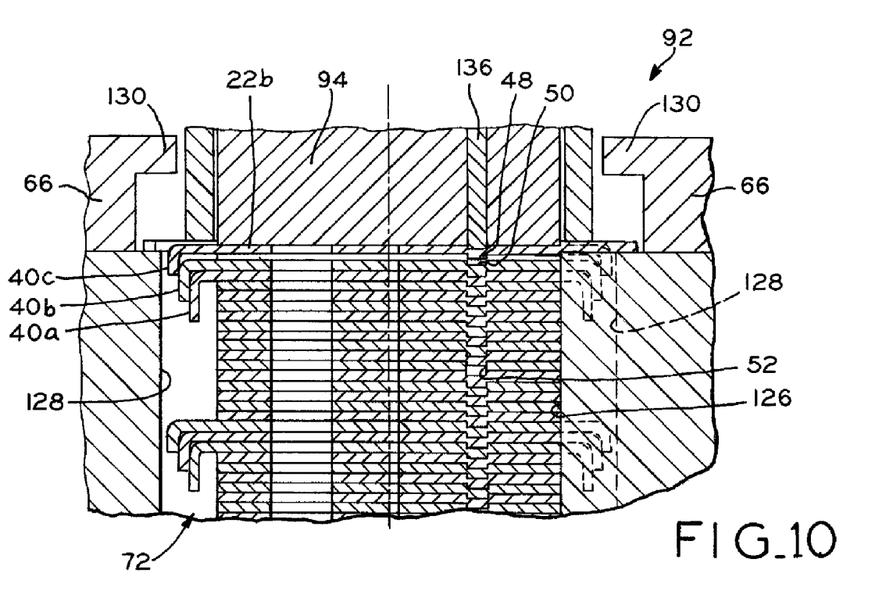
FIG. 10 is a continuation of FIG. 9, showing partial separation of an individual lamina from the strip of stock material with concurrent interlocking of the interlock tabs of the lamina with the interlock recesses of a lower, adjacent lamina in the choke cavity.

In FIG. 10, continued downward movement of upper die assembly 58 in the die stroke moves blanking punch 94 downwardly, beginning to sever an individual lamina 22b from the remainder of strip 62 while concurrently beginning to press the interlock tabs 48 of the lamina 22b into tight engagement within the corresponding interlock recesses 50 of a respective adjacent lower lamina 22b which has been previously blanked into choke cavity 72. In this manner, the lamina which is to be blanked from strip 62 begins interlocking with the respective next, lower adjacent lamina within choke cavity before being severed from strip 62, such that each lamina may include two or more discrete portions or segments, as discussed in detail in the above-incorporated U.S. Pat. No. 6,163,949 to Neuenschwander. Concurrently, portions of the outer edges of the lamina 22b are forced into tight frictional engagement with the inner surfaces of walls 122, 124, and 126 of choke cavity 72. In this manner, the laminas within choke cavity 72, which have already been blanked from strip 62 and transferred into choke cavity 72, collectively provide a large amount of resistance or back pressure which facilitates the interlocking of the partially severed lamina with the lower, adjacent lamina within choke cavity 72.

Figure 11:
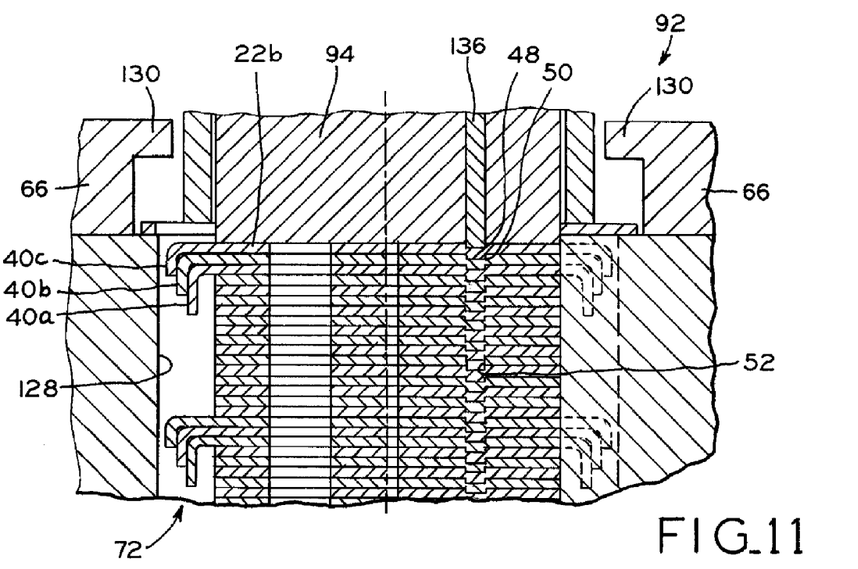
FIG. 11 is a continuation of FIG. 10, showing the separation of an individual lamina from the strip of stock material at the completion of the blanking stroke.

In FIG. 11, continued downward movement of upper die assembly 58 in the die stroke causes blanking punch 94 to completely sever the individual lamina 22b from the remainder of strip 62 of stock material, and the interlock tabs 48 of the blanked lamina 22b are pressed by staking punch inserts 136 into complete, tight, interlocked engagement with the interlock recesses 50 of the respective, adjacent lower lamina. Concurrently, projection 40c of the blanked lamina 22b is pressed into overlapping abutment with projection 40b of the next lower adjacent lamina 22b. Thereafter, die assembly 58 and blanking punch 94 move upwardly and away from strip 62, and the stock lifter lifts strip 62 slightly upwardly away from choke cavity 72 and lower die bed 64 of lower die assembly 56, as described above. Further details regarding the above-described blanking operation are discussed in the above-incorporated U.S. Pat. No. 6,163,949 to Neuenschwander and U.S. patent application Ser. No. 10/959,292.

Below, exemplary steps for manufacturing the exemplary lamina stack 20 of FIGS. 1-4 using die assembly 54 of the present invention are described. However, it should be understood that one of ordinary skill in the art, using the teachings herein, could modify the construction and operation of die assembly 54 to manufacture the exemplary lamina stacks 20 according to a different operational sequence, and/or could modify the construction and operation of die assembly 54 to manufacture other types of lamina stacks including both punched and formed features.

In order to manufacture the exemplary lamina stack 20, shown in FIGS. 1-4, strip 62 is fed into die assembly 54 by feeder 60, with pilot pins 78 engaging pilot holes 76 in strip 62 to pilot strip 62 through die assembly 50. The bottom lamina 22a is first produced, with Station 2 idle and the punches 84 of Station 3 punching rectangular openings 86 therein. Station 4 is idle, and punches 90 of Station 5 punch apertures 52 in the lamina 22a. Forming Stations 6-8 are idle, and punch 94 of blanking station 92 blanks the bottom lamina 22a from strip 62 into choke cavity 72. Although the exemplary lamina stack 20 only includes one bottom lamina 22a having apertures 52 as described above, it may be desired or necessary at the start of a manufacturing operation to blank a plurality of such laminas having apertures 52 into choke cavity 72, whereby the outer edges of each of the laminas 22a are frictionally engaged within walls 122, 124, and 126 of choke cavity 72 to provide a sufficient back pressure of laminas 22a within choke cavity 72 to facilitate the interlocking of subsequent laminas 22a and 22b which are blanked into choke cavity 72 as described above. Thereafter, a plurality of additional first laminas 22a are formed in a similar manner, with punches 88 of Station 4 operable to form interlock tabs 48 and recesses 50 in the laminas 22a and Station 5 being idle.

Thereafter, three second laminas 22b are produced, wherein punches 80 of Station 2 form the outline of projections 40a, 40b, and 40c in strip 62 with Station 3 being idle. Interlock tabs 48 and recesses 50 are formed at Station 4, and Stations 6-8 form projections 40a, 40b, and 40c in successive second laminas 22b as described above before same are blanked from strip 62 at blanking station 92 and interlocked with other lamina in choke cavity 72. Thereafter, a number of additional first laminas 22a may be produced as described above and interlocked to complete each stack 20.

From the foregoing, it may be seen that die assembly 54, including forming stations 100 at die Stations 6-8 in addition to conventional punching stations, allow the manufacture of lamina stacks having formed, as opposed to only stamped, features therein, in which at least one of the laminas in the stack includes at least one portion thereof which extends or projects outwardly of the plane of the lamina itself.

Figure 12:
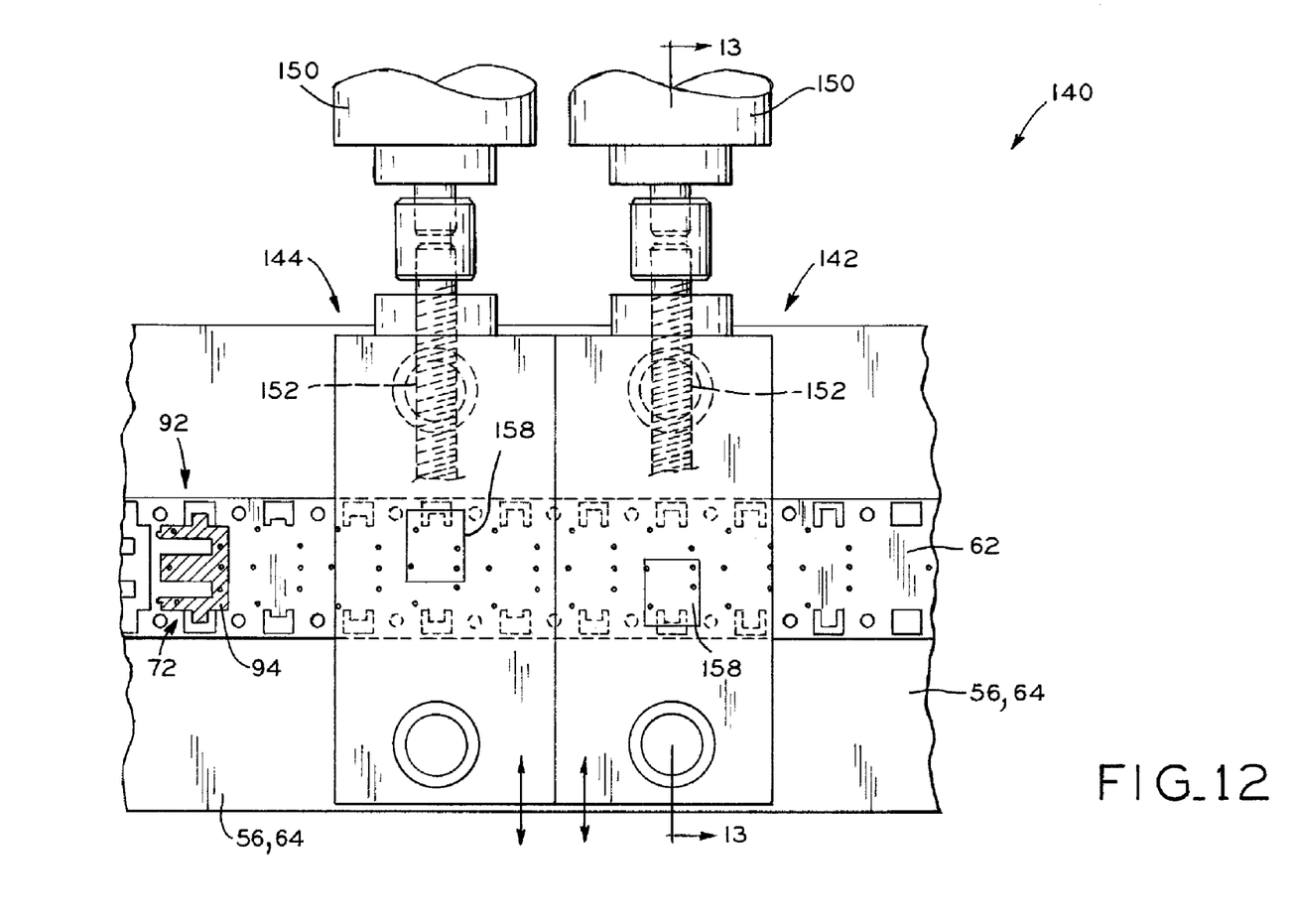
FIG. 12 is a fragmentary top view of a portion of the die assembly according to an alternate embodiment, showing a pair of laterally-displaceable die sections.
Figure 13:
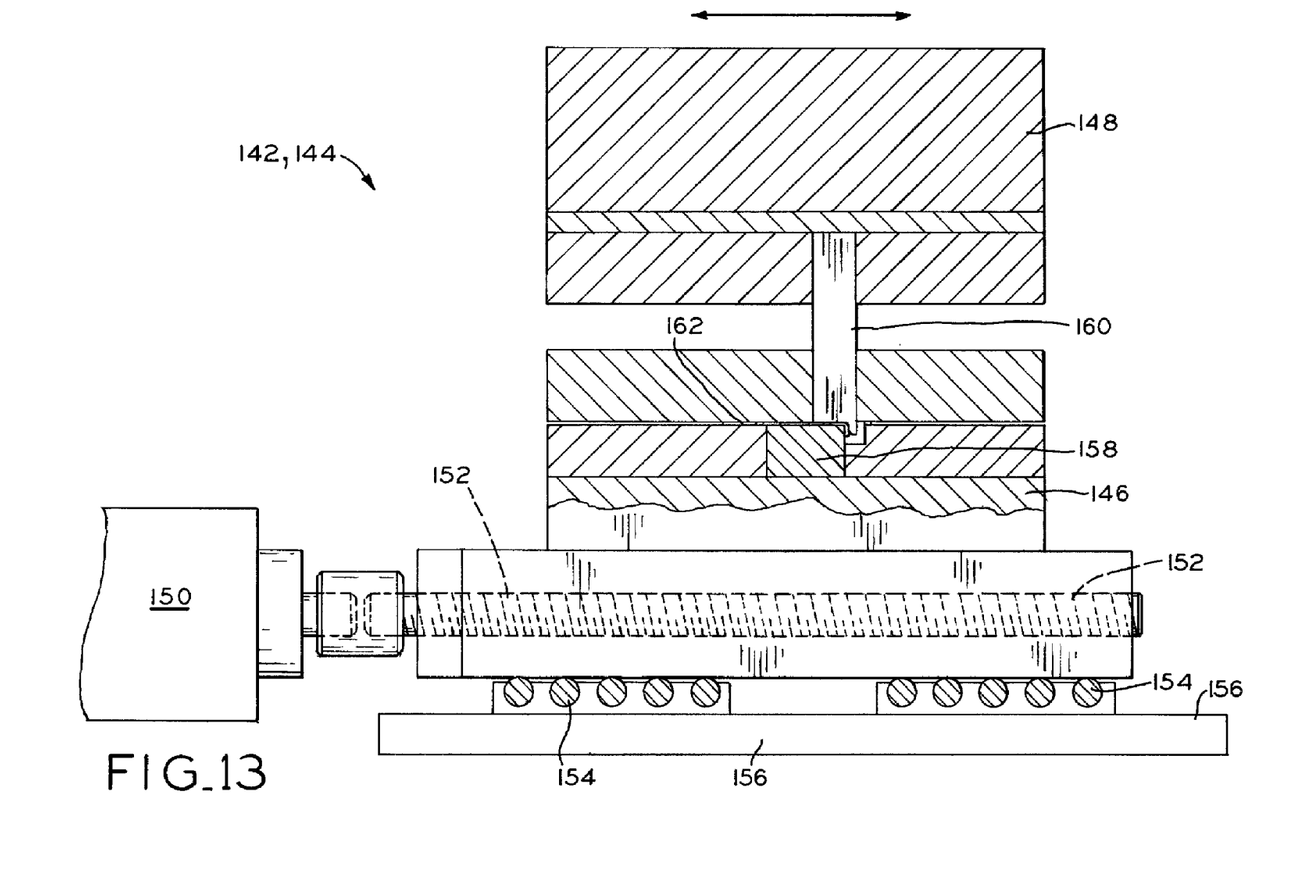
FIG. 13 is a sectional view taken along line 13-13 of FIG. 12.

Die assembly 54 described above includes three separate, selectively actuable forming stations 100, with each station forming one of projections 40a, 40b, and 40c. However, in a second embodiment, shown in FIGS. 12 and 13 and described below, the die assembly may include one or more indexable or laterally adjustable forming stations having die sections which are laterally movable with respect to the progression direction of strip 62. Referring to FIGS. 12 and 13, die assembly 140 according to another embodiment of the present invention is shown. Die assembly 140 includes many features which are identical to those of die assembly 54 described above, and the same reference numerals are used to designate identical or substantially identical components therebetween.

Die assembly 140 includes a pair of laterally-movable die sections 142 and 144 which are separate from the remainder of lower and upper die assemblies 56 and 58, with one die section 142 operable to form projections 40a, 40b, and 40c on one side of each lamina 22b, and the other die section 144 operable to form projections 40a, 40b, and 40c on the other side of each lamina 22b. Except as described below, die sections 142 and 144 are similar to the transversely movable die sections described in U.S. Pat. No. 6,484,387 to Lee et al., assigned to the assignee of the present application, the disclosure of which is expressly incorporated herein by reference. Each die section 142 and 144 generally includes a lower die bed 146 and an upper die bed 148, which are coupled together for lateral movement as a unit with respect to the remainder of the die assembly 140 along the directions of the arrows of FIGS. 12 and 13. In each die section 142 and 144, a linear actuator 150, such as a servomotor or stepper motor, is coupled to a drive screw 152 threaded through a threaded bore in lower die bed 146, with lower and upper die beds 146 and 148 together movably supported on bearings 154 on support surface 156. Lower die bed 146 includes a carbide forming insert 158, and upper die bed 148 includes a forming tool 160, similar to those described above.

In operation, lower and upper die beds 146 and 148 of die sections 142 and 144 are laterally movable with respect to the remainder of die assembly 140 and to strip 62, such that carbide forming insert 158 and forming tool 160 may be aligned with different portions of a projection 40 in strip 62, to thereby vary the location of bends 46 in projections 40 to selectively form projections 40a, 40b, and 40c about bends 46a, 46b, and 46c. In this manner, first die section 142 may form each of projections 40a, 40b, and 40c in strip 62 on one side of lamina stock 20, while die section 144 forms projections 40a, 40b, and 40c in strip 62 on the opposite side of lamina stack 20. Otherwise, die assembly 140 functions identically to die assembly 54, described above.

The selectively actuable components of die assemblies 54 and 140, such as the selectively actuable punches, the selectively actuable forming stations, and the indexable forming stations thereof, may be controlled by one or more suitable controllers of the type disclosed in the above-incorporated U.S. patents, and in U.S. Pat. Nos. 4,738,020, 5,087,849, and 5,123,155 to Neuenschwander, assigned to the assignee of the present invention, the disclosures of which are expressly incorporated herein by reference.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A die assembly for manufacturing lamina stacks from a strip of substantially planar material, comprising:
    at least one die station including a lamina interlock feature punch configured to punch a lamina interlock feature in the strip;
    at least one forming station including at least one forming tool configured to form a non-interlocking lamina portion in the strip which is disposed outwardly of the plane of the strip;
    a blanking station including a blanking punch configured to blank individual laminas from the strip; and
    a choke assembly including a choke cavity configured to receive individual laminas blanked from the strip, wherein said blanking station includes at least one staking punch, each staking punch engageable with a respective lamina interlock feature in the strip to interlock a blanked lamina with a previously blanked lamina in said choke assembly substantially concurrently with blanking the blanked lamina from the strip.

2. The die assembly of claim 1, wherein said forming tool of said forming station is selectively actuable.

3. The die assembly of claim 1, wherein said forming tool of said forming station is selectively indexable to form bends in successive laminas in the strip along non-colinear bend lines.

4. A die assembly for manufacturing lamina stacks from a strip of substantially planar material, comprising:
at least one die station including a punch configured to punch a lamina feature substantially within the plane of the strip,
at least one of said die stations including a lamina interlock feature punch configured to punch a lamina interlock feature in the strip, said lamina interlock feature comprising at least one projection in one of the laminas, each said projection dimensioned to fit within a respective recess in another of the laminas;
at least one forming station including at least one forming tool configured to form a non-interlocking lamina portion in the strip which is disposed outwardly of the plane of the strip;
a blanking station including a blanking punch configured to blank individual laminas from the strip; and
a choke assembly including a choke cavity configured to receive individual laminas blanked from the strip.

5. The die assembly of claim 4, wherein said forming tool of said forming station is selectively indexable to form bends in successive laminas in the strip along non-colinear bend lines.

6. The die assembly of claim 4, wherein said forming tool of said forming station is selectively actuable.

7. A die assembly for manufacturing lamina stacks from a strip of substantially planar material, comprising:
at least one die station including a punch configured to punch a lamina feature substantially within the plane of the strip;
first and second forming stations each including at least one forming tool configured to form a non-interlocking lamina portion in the strip which is disposed outwardly of the plane of the strip, said first forming station including a selectively actuable first forming tool configured to bend at least a portion of the strip along a first bend line and said second forming station including a selectively actuable second forming tool configured to bend at least a portion of the strip along a second bend line, said second bend line non-colinear with said first bend line;
a blanking station including a blanking punch configured to blank individual laminas from the strip; and
a choke assembly including a choke cavity configured to receive individual laminas blanked from the strip.

8. A die assembly for manufacturing lamina stacks from a strip of substantially planar material, comprising:
at least one die station including a lamina interlock feature punch configured to punch a lamina interlock feature in the strip;
at least first and second forming stations each including at least one selectively actuable forming tool configured to form a lamina portion in the strip which is disposed substantially outwardly of the plane of the strip, said first forming station including a selectively actuable forming tool configured to bend at least a portion of the strip along a first bend line and said second forming station including a selectively actuable forming tool configured to bend at least a portion of the strip along a second bend line, said second bend line non-colinear with said first bend line;
a choke assembly including a choke cavity configured to receive individual blanked laminas from the strip; and
a blanking station including at least one blanking punch configured to blank individual laminas from the strip, said blanking station further including at least one staking punch engageable with a respective lamina interlock feature in the strip to interlock blanked laminas with previously blanked laminas within said choke assembly;
a first forming station including a selectively actuable forming tool configured to bend at least a portion of the strip along a first bend line; and
a second forming station including a selectively actuable forming tool configured to bend at least a portion of the strip along a second bend line, said second bend line non-colinear with said first bend line.

9. A die assembly for manufacturing lamina stacks from a strip of substantially planar material, comprising:
at least one die station including a lamina interlock feature punch configured to punch a lamina interlock feature in the strip;
at least one forming station including at least one selectively actuable forming tool configured to form a non-interlocking lamina portion in the strip which is disposed substantially outwardly of the plane of the strip;
a choke assembly including a choke cavity configured to receive individual blanked laminas from the strip; and
a blanking station including at least one blanking punch configured to blank individual laminas from the strip, said blanking station further including at least one staking punch engageable with a respective lamina interlock feature in the strip to interlock blanked laminas with previously blanked laminas within said choke assembly substantially concurrently with blanking the blanked laminas from the strip, wherein said forming tool of said forming station is selectively indexable to form bends in successive laminas in the strip along non-colinear bend lines.

10. The die assembly of claim 9, wherein said lamina interlock feature comprises a projection in one of the laminas which is dimensioned to fit into a cooperating recess in another of the laminas.

11. The die assembly of claim 9, wherein said forming tool of said at least one forming station is configured to bend at least a portion of the strip.

12. A die assembly for manufacturing lamina stacks from a strip of substantially planar material, comprising:
at least one die station including a punch configured to punch a lamina feature substantially within the plane of the strip;
at least one forming station including at least one selectively indexable forming tool configured to form a non-interlocking lamina portion in the strip which is disposed outwardly of the plane of the strip, said forming station including at least one die section movable in a direction that is oriented at an angle with respect to a longitudinal axis of the strip;
a blanking station including a blanking punch configured to blank individual laminas from the strip, wherein said blanking station includes at least one staking punch, each staking punch engageable with a respective lamina interlock feature in the strip to interlock a blanked lamina with a previously blanked lamina in said choke assembly substantially concurrently with blanking the blanked lamina from the strip; and a choke assembly including a choke cavity configured to receive individual laminas blanked from the strip.

13. The die assembly of claim 12, wherein at least one of said die stations includes a lamina interlock feature punch configured to punch a lamina interlock feature in the strip, said lamina interlock feature comprising at least one projection in one of the laminas, each said projection dimensioned to fit within a respective recess in another of the laminas.

14. The die assembly of claim 12, wherein said forming tool of said forming station is selectively actuable.

* * * * *